US011897726B2

(12) United States Patent
Pahlke

(10) Patent No.: US 11,897,726 B2
(45) Date of Patent: Feb. 13, 2024

(54) COMMUNICATIONS SYSTEM FOR CONVEYANCE SYSTEM

(71) Applicant: Otis Elevator Company, Farmington, CT (US)

(72) Inventor: Derk Oscar Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1182 days.

(21) Appl. No.: 16/576,140

(22) Filed: Sep. 19, 2019

(65) Prior Publication Data

US 2021/0087016 A1 Mar. 25, 2021

(51) Int. Cl.

*B66B 1/34* (2006.01)
*B66B 1/14* (2006.01)
*B66B 1/46* (2006.01)
*B66B 1/52* (2006.01)

(52) U.S. Cl.

CPC .............. *B66B 1/3461* (2013.01); *B66B 1/14* (2013.01); *B66B 1/3423* (2013.01); *B66B 1/468* (2013.01); *B66B 1/52* (2013.01); *B66B 2201/4646* (2013.01)

(58) Field of Classification Search

CPC ....... B66B 1/3461; B66B 1/14; B66B 1/3423; B66B 1/468; B66B 1/52; B66B 2201/4646; B66B 1/30; B66B 1/3446; B66B 3/008; B66B 5/0018; B66B 5/02

See application file for complete search history.

(56) References Cited

U.S. PATENT DOCUMENTS

| | | | | |
|---|---|---|---|---|
| 10,343,874 | B2 | 7/2019 | Scoville et al. | |
| 2009/0057069 | A1 | 3/2009 | Boggess | |
| 2016/0264377 | A1* | 9/2016 | Beloin | B66B 1/3461 |
| 2017/0260024 | A1 | 9/2017 | Sha et al. | |
| 2017/0291800 | A1* | 10/2017 | Scoville | B66B 19/00 |
| 2018/0086597 | A1 | 3/2018 | Song et al. | |
| 2019/0023529 | A1 | 1/2019 | Lau | |
| 2019/0225457 | A1 | 7/2019 | Koivisto et al. | |
| 2019/0382238 | A1* | 12/2019 | Witczak | B66B 5/0018 |
| 2019/0393950 | A1* | 12/2019 | Oggianu | H04B 7/15507 |
| 2020/0062539 | A1* | 2/2020 | Carriero | H04L 65/1069 |
| 2020/0122964 | A1* | 4/2020 | Sudi | B66B 1/3492 |

FOREIGN PATENT DOCUMENTS

| | | | |
|---|---|---|---|
| CN | 101054142 | A | 10/2007 |
| CN | 201590217 | U | 9/2010 |
| CN | 201667193 | U | 12/2010 |

(Continued)

OTHER PUBLICATIONS

Chinese Office Action for Application No. 202010242692.6; dated May 6, 2022; 10 Pages.

(Continued)

*Primary Examiner* — Jeffrey Donels
(74) *Attorney, Agent, or Firm* — CANTOR COLBURN LLP

(57) ABSTRACT

A conveyance system includes a local gateway configured to communicate with a remote system over a communications network; at least one module in communication with the local gateway; the at least one module including a processor configured to perform local processing of data at the at least one module.

16 Claims, 4 Drawing Sheets

(56) References Cited

FOREIGN PATENT DOCUMENTS

| | | | | | |
|---|---|---|---|---|---|
| CN | 102874666 | A | | 1/2013 | |
| CN | 202880605 | U | | 4/2013 | |
| CN | 103248873 | A | | 8/2013 | |
| CN | 203976149 | U | | 12/2014 | |
| CN | 204022161 | U | | 12/2014 | |
| CN | 105480806 | A | | 4/2016 | |
| CN | 106302722 | A | | 1/2017 | |
| CN | 106335825 | A | | 1/2017 | |
| CN | 106516922 | A | | 3/2017 | |
| CN | 206332699 | U | | 7/2017 | |
| CN | 206336872 | U | | 7/2017 | |
| CN | 107082332 | A | | 8/2017 | |
| CN | 206476614 | U | | 9/2017 | |
| CN | 107310998 | A | | 11/2017 | |
| CN | 107381263 | A | | 11/2017 | |
| CN | 207957435 | U | | 10/2018 | |
| CN | 108750848 | A | | 11/2018 | |
| CN | 108792871 | A | | 11/2018 | |
| CN | 108861917 | A | | 11/2018 | |
| CN | 208378121 | U | | 1/2019 | |
| CN | 109384107 | A | | 2/2019 | |
| CN | 109626170 | A | | 4/2019 | |
| CN | 109678021 | A | | 4/2019 | |
| CN | 109775501 | A | | 5/2019 | |
| CN | 110040591 | A | | 7/2019 | |
| EP | 3575256 | A1 | * | 12/2019 | ........... B66B 1/3446 |
| EP | 3575258 | A1 | * | 12/2019 | ........... B66B 1/3461 |
| EP | 3608269 | A1 | * | 2/2020 | ........... B66B 1/3453 |
| WO | 2018134205 | A1 | | 7/2018 | |
| WO | WO-2020239782 | A1 | * | 12/2020 | ........... B66B 1/3423 |

OTHER PUBLICATIONS

European Search Report for Application No. 20166993.4; dated Feb. 5, 2021; 7 Pages.

* cited by examiner

COMMUNICATIONS SYSTEM FOR CONVEYANCE SYSTEM

BACKGROUND

The embodiments herein relate to the field of conveyance systems, and particularly to a communications system for a conveyance system.

Conveyance systems, such as, for example, elevator systems, escalator systems, and moving walkways, may need to transmit data to and from various system components. Existing systems may provide wired and/or wireless communications between system components, but certain systems are overly complex and not readably scalable.

SUMMARY

According to an embodiment, a conveyance system includes a local gateway configured to communicate with a remote system over a communications network; at least one module in communication with the local gateway; the at least one module including a processor configured to perform local processing of data at the at least one module.

In addition to one or more of the features described herein, or as an alternative, further embodiments may include an elevator car; wherein the at least one module includes a car level module mounted to the elevator car, the car level module including a location sensor configured to detect a location of the elevator car relative to a landing.

In addition to one or more of the features described herein, or as an alternative, further embodiments may include an elevator car; wherein the at least one module includes a light presence module to the elevator car, the light presence module including a light sensor configured to detect a light level in the elevator car.

In addition to one or more of the features described herein, or as an alternative, further embodiments may include an elevator car; wherein the at least one module includes a sensor module mounted to the elevator car, the sensor module including a sensor configured to detect a condition at the elevator car.

In addition to one or more of the features described herein, or as an alternative, further embodiments may include wherein the condition includes at least one of acceleration, air pressure and sound.

In addition to one or more of the features described herein, or as an alternative, further embodiments may include an elevator car; wherein the at least one module includes a voice module mounted to the elevator car, the voice module including a microphone and a speaker.

In addition to one or more of the features described herein, or as an alternative, further embodiments may include wherein the voice module is configured provide at least one of uni-directional and bi-directional voice communication at the elevator car.

In addition to one or more of the features described herein, or as an alternative, further embodiments may include an elevator car; wherein the at least one module includes an operating panel module mounted to the elevator car, the operating panel module including a user interface.

In addition to one or more of the features described herein, or as an alternative, further embodiments may include wherein the user interface is configured to receive a destination floor from a passenger.

In addition to one or more of the features described herein, or as an alternative, further embodiments may include wherein the user interface includes an audio/video unit.

In addition to one or more of the features described herein, or as an alternative, further embodiments may include an elevator car; wherein the at least one module includes a processing module mounted to the elevator car, the processing module including a wireless interface and a wired interface.

In addition to one or more of the features described herein, or as an alternative, further embodiments may include wherein the wireless interface provides communication between the processing module and a second module of the at least one module.

In addition to one or more of the features described herein, or as an alternative, further embodiments may include wherein the processing module provides local processing of data received from the second module to generate processed data.

In addition to one or more of the features described herein, or as an alternative, further embodiments may include wherein the processing module is configured to provide the processed data to the local gateway.

In addition to one or more of the features described herein, or as an alternative, further embodiments may include wherein the wired interface is configured to communicate over an elevator system bus.

In addition to one or more of the features described herein, or as an alternative, further embodiments may include wherein the wired interface is configured to provide power to the processing module.

In addition to one or more of the features described herein, or as an alternative, further embodiments may include an elevator car; wherein the at least one module includes a car level module, a light presence module, a sensor module, a voice module and an operating panel module mounted to the elevator car.

In addition to one or more of the features described herein, or as an alternative, further embodiments may include wherein the at least one module includes a car level module, a light presence module, a sensor module, a voice module, an operating panel module and a processing module mounted to the elevator car.

In addition to one or more of the features described herein, or as an alternative, further embodiments may include wherein the at least one module includes a power source.

In addition to one or more of the features described herein, or as an alternative, further embodiments may include wherein the power sources includes at least one of a battery, a power line, an inductive power receiver, a regenerative power source and an energy harvesting device.

Technical effects of embodiments of the present disclosure include providing a communications system for a conveyance system that is scalable.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
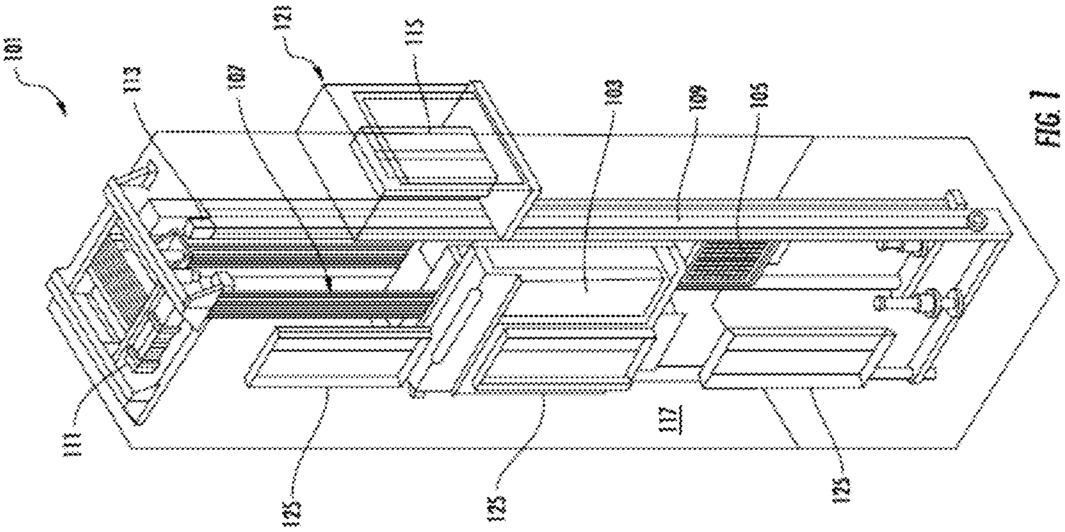
FIG. 1 depicts an elevator system that may employ various embodiments of the present disclosure.

FIG. 1 is a perspective view of a conveyance system in the form of an elevator system 101 including an elevator car 103, a counterweight 105, a tension member 107, a guide rail 109, a machine 111, a position reference system 113, and a system controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The system controller 115 is located, as shown, in a controller room 121 of the elevator hoistway 117 and is configured to control the operation of the elevator system 101, and particularly the elevator car 103. For example, the system controller 115 may provide drive signals to the machine 111 to control the acceleration, deceleration, leveling, stopping, etc. of the elevator car 103. The system controller 115 may also be configured to receive position signals from the position reference system 113 or any other desired position reference device. When moving up or down within the elevator hoistway 117 along guide rail 109, the elevator car 103 may stop at one or more landings 125 as controlled by the system controller 115. Although shown in a controller room 121, those of skill in the art will appreciate that the controller 115 can be located and/or configured in other locations or positions within the elevator system 101. In one embodiment, the system controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance system component such as an elevator car 103 of the elevator system 101. In another example, embodiments disclosed herein may be applicable conveyance systems such as an escalator system and a conveyance system component such as a moving stair of the escalator system.

Figure 2:
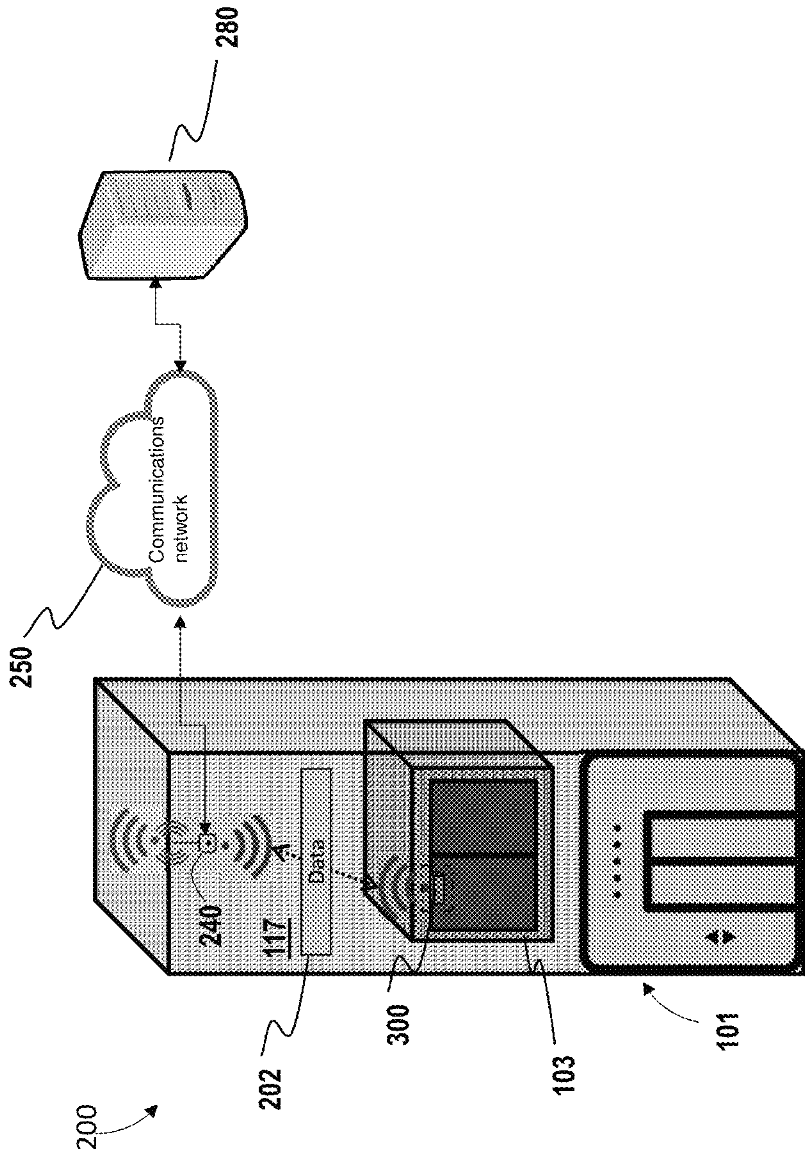
FIG. 2 depicts data transmission in an elevator system in an example embodiment.

FIG. 2 is a view of a communications system 200 including at least one module 300, according to an embodiment of the present disclosure. Example modules 300 are described in further detail herein with reference to FIGS. 3 and 4. The module 300 generates data 202 that is communicated to a local gateway 240. The local gateway 240 may also send data to the module 300, such that bi-directional communication is provided between the module 300 and the local gateway 240. The local gateway 240 may be mounted in a top of the hoistway 117. Data 202 from the module 300 may then be transmitted to a remote system 280 over a communications network 250. The communications network 250 may use one or both of wired and wireless topologies (LAN, WAN, cellular, satellite, etc.).

The remote system 280 may be a computing device, such as, for example, a desktop computer, server, distributed computing system (e.g., cloud computing), etc. The remote system 280 may also be a mobile computing device that is typically carried by a person, such as, for example a smartphone, PDA, smartwatch, tablet, laptop, etc. The remote system 280 may also be two separate devices that optionally are synced together, such as, for example, a cellular phone and a desktop computer synced over an internet connection.

Figure 3:
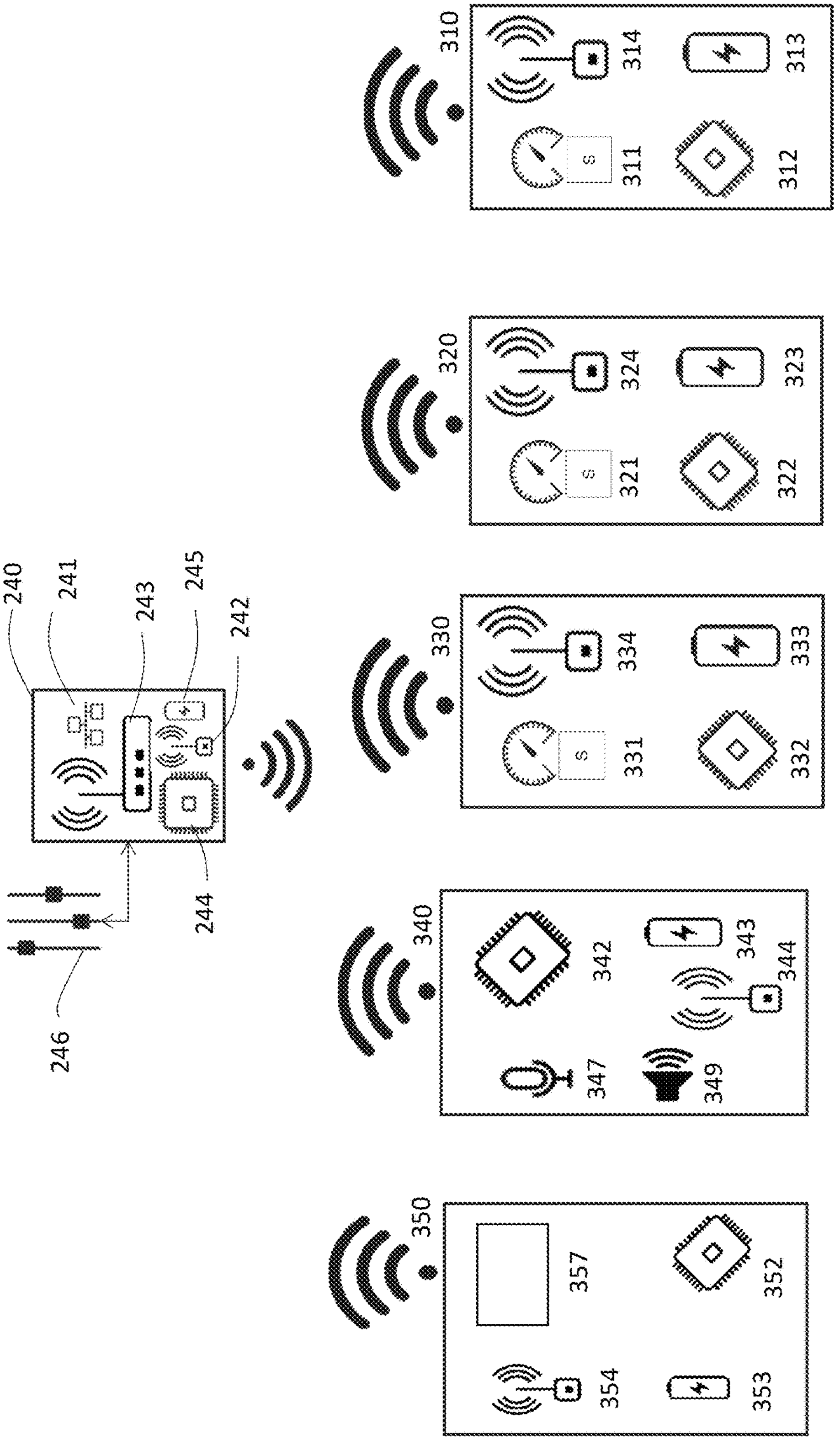
FIG. 3 depicts modules in communication with a local gateway in an example embodiment.

FIG. 3 depicts the local gateway 240 and a plurality of modules in an example embodiment. The local gateway 240 may include multiple communications elements, including a wired interface 241 (e.g., a wired LAN connection) and one or more wireless interfaces 242 (e.g., BlueTooth, 802.11xx, WiFi, Zigbee, zWave, etc.) and 243 (e.g., BlueTooth, 802.11xx, WiFi, Zigbee, zWave, etc.). The local gateway 240 includes a processor 244 having an associated memory and a power source 245. The processor 244 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium. The power source 245 may include a battery, an energy harvesting device a power line, and/or any other known power source. The local gateway 240 may communicate with a system bus of the elevator system 101 over a bus interface 246 (e.g., an RS422 bus) or wirelessly. In this way, data from the various modules can be sent to the system controller 115 to control operation of the elevator system 101. The local gateway 240 may communicate with the remote system 280 over the communications network 250 using a port on the wired interface 241.

A car level module 310 is mounted to the elevator car 103 and is configured to obtain data used to level the elevator car 103 at a landing 125. The car level module 310 includes a location sensor 311 configured to detect a location of the elevator car 103 relative to a landing 125. The car level module 310 includes a processor 312, having an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium.

A power source 313 for components of the car level module 310 may include a battery, a power line coupled to the elevator car 103, an inductive power receiver, a regenerative power source, an energy harvesting device and/or any other known power source. A communications unit 314 can provide the car level data from location sensor 311 to the local gateway 240, which is then forwarded to the system controller 115 to adjust the location of the elevator car 103 with respect to a landing 125. The communications unit 314 may use one or more wireless communications protocols to communicate with the local gateway 240, such as Bluetooth, BLE, Wi-Fi, HaLow (801.11ah), Wireless M-Bus, Zigbee, zWave, or any other known communication method.

In the embodiment of FIG. 3, the processor 312 of the car level module 310 performs processing of the data from the location sensor 311. The local processing performed by the processor 312 may be referred to as edge computing. The local processing of the data from the location sensor 311 reduces the amount of data that needs to be sent to the local gateway 240 and/or the system controller 115, thus reducing bandwidth needed for communication. For example, rather than sending raw sensor data from the location sensor 311 to the system controller 115, the car level module 310 can compute a distance and direction of car movement needed to level the elevator car 103 with a landing 125, and send the distance and direction of car movement to the system controller 115 via the local gateway 240. The system controller 115 can then control the machine 111 to position the elevator car 103 appropriately.

A light presence module 320 is mounted inside the elevator car 103 and is configured to determine if light is present inside the elevator car 103. The presence/absence of light may be used to confirm that lighting fixtures inside the elevator car 103 are functioning properly. The presence/absence of light in the elevator car 103 may also indicate if the elevator car 103 is at a landing with the doors open. The light presence module 320 includes a light sensor 321 (e.g., a photodiode, video camera, etc.) configured to detect light levels in the elevator car 103. The light presence module 320 includes a processor 322, having an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium.

A power source 323 for components of the light presence module 320 may include a battery, a power line coupled to the elevator car 103, an inductive power receiver, a regenerative power source, an energy harvesting device and/or any other known power source. A communications unit 324 can provide the light level data from the light sensor 321 to the local gateway 240, which is then forwarded to the system controller 115. The communications unit 324 may use one or more wireless communications protocols to communicate with the local gateway 240, such as Bluetooth, BLE, Wi-Fi, HaLow (801.11ah), Wireless M-Bus, Zigbee, zWave, or any other known communication method.

In the embodiment of FIG. 3, the processor 322 of the light presence module 320 performs processing of the data from the light sensor 321. The local processing performed by processor 322 may be referred to as edge computing. The local processing of the data from the light sensor 321 reduces the amount of data that needs to be sent to the local gateway 240 and/or the system controller 115, thus reducing bandwidth needed for communication. For example, rather than sending raw sensor data from the light sensor 321 to the system controller 115, the light presence module 320 can determine if the sensed light level is greater than a threshold and send the result of that determination to the system controller 115. The system controller 115 can then determine whether maintenance is needed or the status of the elevator car 103.

A sensor module 330 is mounted on the elevator car 103 and is configured to sense various conditions at the elevator car 103. The sensed condition data may be used to confirm location and proper operation of the elevator car 103. The sensor module 330 includes at least one sensor 331 configured to detect conditions, such as acceleration, air pressure and sound. The sensor module 330 includes a processor 332, having an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium.

A power source 333 for components of the sensor module 330 may include a battery, a power line coupled to the elevator car 103, an inductive power receiver, a regenerative power source, an energy harvesting device and/or any other known power source. A communications unit 334 can provide the sensed condition data from the sensor 331 to the local gateway 240, which is then forwarded to the system controller 115. The communications unit 334 may use one or more wireless communications protocols to communicate with the local gateway 240, such as Bluetooth, BLE, Wi-Fi, HaLow (801.11ah), Wireless M-Bus, Zigbee, zWave, or any other known communication method.

In the embodiment of FIG. 3, the processor 332 of the sensor module 330 performs processing of the data from the sensor 331. The local processing performed by processor 332 may be referred to as edge computing. The local processing of the data from the sensor 331 reduces the amount of data that needs to be sent to the local gateway 240 and/or the system controller 115, thus reducing bandwidth needed for communication. For example, rather than sending raw sensor data from the sensor 331 to the system controller 115, the sensor module 330 can determine car location (e.g., based on acceleration data and/or air pressure data) or determine faults (e.g., based on sound data). The system controller 115 can then determine whether the elevator car 103 needs to move or if maintenance is needed.

A voice module 340 is mounted in the elevator car 103 and is configured to provide voice communications between a passenger in the elevator car 103 and a remote user. The voice module 340 may be used in the event a passenger is trapped in the elevator car 103. The voice module 340 includes microphone 347 and a speaker 349 used to provide uni-directional or bi-directional voice communication with the elevator car 103. The voice module 340 includes a processor 342, having an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium.

A power source 343 for components of the voice module 340 may include a battery, a power line coupled to the elevator car 103, an inductive power receiver, a regenerative power source, an energy harvesting device and/or any other known power source. A communications unit 344 provides the voice data from the microphone 347 to the local gateway 240. The communications unit 344 provides voice data from a remote user to the speaker 349, via the local gateway 240. The communications unit 344 may use one or more wireless communications protocols to communicate with the local gateway 240, such as Bluetooth, BLE, Wi-Fi, HaLow (801.11ah), Wireless M-Bus, Zigbee, zWave, or any other known communication method. The communications unit 344 may utilize multiple wireless protocols depending on the nature of the data communicated with the local gateway 240. For example, low bandwidth transmissions (e.g., status, heartbeat, etc.) may be communicated using a lower bandwidth protocol (e.g., BlueTooth). Higher bandwidth transmissions (e.g., voice packets) may be communicated using a higher bandwidth protocol (e.g., 802.11xx).

In the embodiment of FIG. 3, the processor 342 of the voice module 340 may perform processing of the data from the microphone 347. The local processing performed by processor 342 may be referred to as edge computing. The local processing of the data from the microphone 347 reduces the amount of data that needs to be sent to the local gateway 240 and/or the system controller 115, thus reducing bandwidth needed for communication. For example, rather than sending raw sound data from the microphone 347 to the local gateway 240, the voice module 340 can encode, compress and/or format the voice data into voice packets that require less bandwidth.

An operating panel module 350 is mounted in the elevator car 103 and is configured to provide a user interface between a passenger and the elevator system 101. The operating panel module 350 may include a user interface 357 that allows a user to specify a destination floor (e.g., buttons or touchscreen). The user interface 357 may also include an audio/video unit that can provide in-car infotainment (e.g., news, sports, weather, music, etc.). The operating panel module 350 includes a processor 352, having an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium.

A power source 353 for components of the operating panel module 350 may include a battery, a power line coupled to the elevator car 103, an inductive power receiver, a regenerative power source, an energy harvesting device and/or any other known power source. A communications unit 354 provides for bidirectional communications with the local gateway. The communications unit 354 may use one or more wireless communications protocols to communicate with the local gateway, such as Bluetooth, BLE, Wi-Fi, HaLow (801.11ah), Wireless M-Bus, Zigbee, zWave, or any other known communication method. The communications unit 354 may utilize multiple wireless protocols depending on the nature of the data communicated with the local gateway 240. For example, low bandwidth transmissions (e.g., a button press indicating a floor selection) may be communicated using a lower bandwidth protocol (e.g., BlueTooth). Higher bandwidth transmissions (e.g., audio and or video) may be communicated using a higher bandwidth protocol (e.g., 802.11xx).

In the embodiment of FIG. 3, the processor 352 of the operating panel module 350 may perform processing of the data from the user interface 357. The local processing performed by processor 352 may be referred to as edge computing. The local processing of the data from the user interface 357 reduces the amount of data that needs to be sent to the local gateway 240 and/or the system controller 115, thus reducing bandwidth needed for communication. For example, rather than sending raw input data from the user interface 357 to the local gateway 240, the operating panel module 350 can process the input (e.g., a button selection) into a format usable by the system controller 115 (e.g., a destination call for that particular elevator car). The processor 352 of the operating panel can also process audio/video data received from the local gateway 240, so that the audio/video data can be transmitted to the elevator car 103 in reduced bandwidth format.

Figure 4:
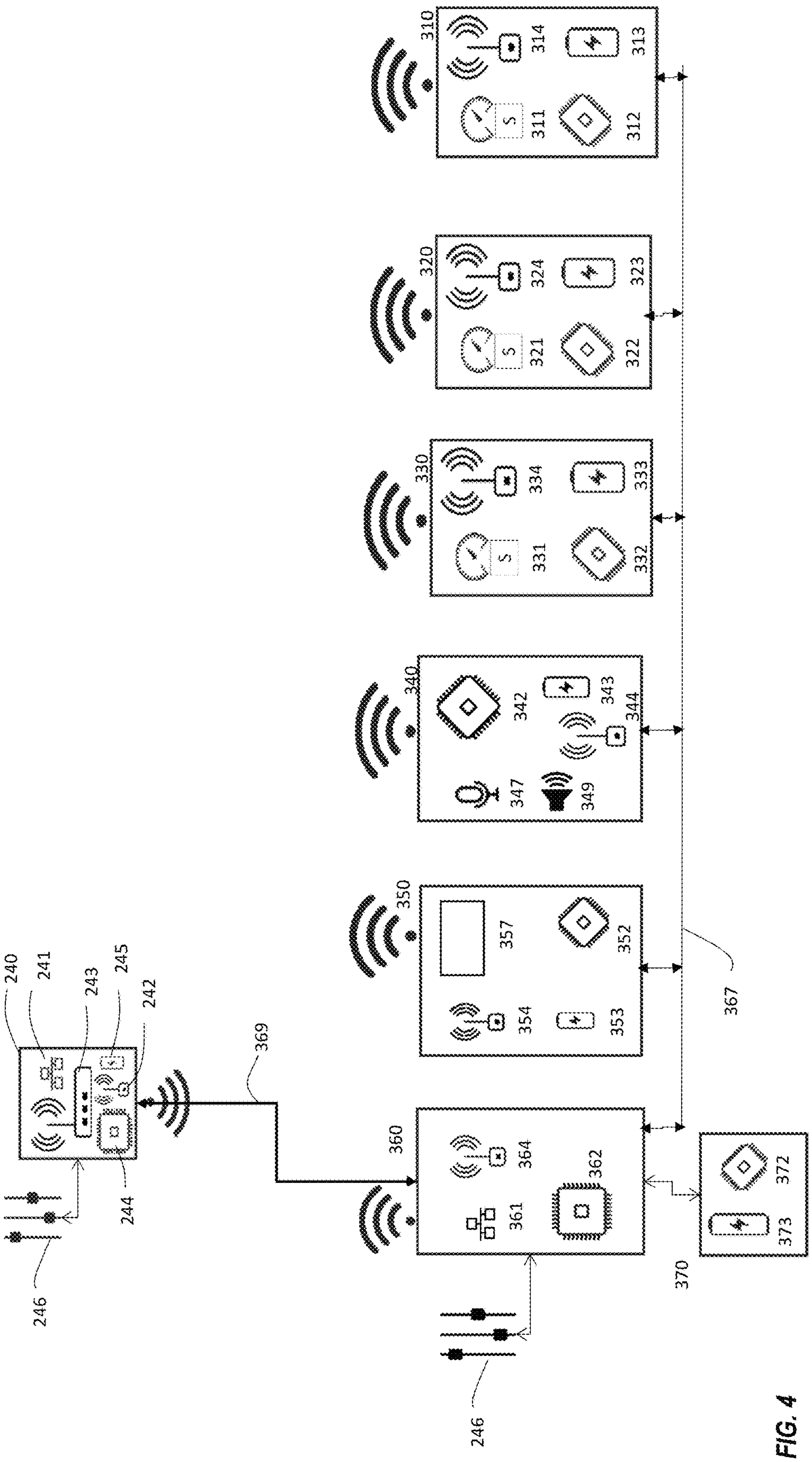
FIG. 4 depicts modules in communication with a local gateway in an example embodiment.

FIG. 4 depicts the local gateway 240 and a plurality of modules in an example embodiment. FIG. 4 is similar to FIG. 3, but also includes a processing module 360 mounted at the elevator car. The processing module 360 includes a communications unit 364 to communicate with other components of the system, such as the local gateway 240, the car level module 310, the light presence module 320, the sensor module 330, the voice module 340 and the operating panel module 350. The communications unit 364 may use one or more wireless communications protocols to communicate with the local gateway, such as Bluetooth, BLE, Wi-Fi, HaLow (801.11ah), Wireless M-Bus, Zigbee, zWave, or any other known communication method. The communications unit 364 may utilize multiple wireless protocols depending on the nature of the data communicated. For example, low bandwidth transmissions (e.g., status, heartbeat, etc.) may be communicated using a lower bandwidth protocol (e.g., BlueTooth). Higher bandwidth transmissions (e.g., voice packets) may be communicated using a higher bandwidth protocol (e.g., 802.11xx).

The processing module 360 includes a processor 362, having an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium.

The processing module 360 includes a wired interface 361 (e.g., a wired LAN connection). The wired interface 361 provides multiple connections. The wired interface 361 may provide communications with the car level module 310, the light presence module 320, the sensor module 330, the voice module 340 and the operating panel module 350 over wiring 367. The wired interface 361 may provide communications between the processing module 360 and the local gateway 240 over wiring 369 (e.g., via a traveling cable). The wired interface 361 may provide communications with a system bus of the elevator system over a bus interface 246 (e.g., an RS422 bus). Power to the processing module 360 may be provided over the bus interface 246.

A backup module 370 is coupled to the processing module 360. The backup module 370 includes a backup power source 373, such as a static or rechargeable battery (e.g., Pb, Li, Li-ion, Lithium-thionyl) with power management for charging and status, capacitor, or other known power source. The backup module 370 also includes a processor 372 and associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium. The processor 372 can handle processing tasks typically performed by processor 362 in the event of a fault in processor 362.

The processing module 360 is in communication with the car level module 310, the light presence module 320, the sensor module 330, the voice module 340 and the operating panel module 350 through the communications unit 364 and/or the wired interface 361. The processing module 360 is used to perform the local processing (e.g., edge computing) in embodiments where one or more of the car level module 310, the light presence module 320, the sensor module 330, the voice module 340 and the operating panel module 350 are not configured for local processing. In operation, the processing module 360 will receive data from one or more of the car level module 310, the light presence module 320, the sensor module 330, the voice module 340 and the operating panel module 350. The data is processed at the processing module 360 and the processed data is transmitted to the local gateway 240 and/or the system controller 115, thus reducing bandwidth needed for communication. Local processing of the data at the processing module 360 reduces bandwidth needed for communications. The processing module 360 may also receive data from the local gateway 240 and/or the system controller 115, process that data and then send the processed data to one or more of the car level module 310, the light presence module 320, the sensor module 330, the voice module 340 and the operating panel module 350.

The system architecture of embodiments of the disclosure is scalable from a lowest cost base configuration to full high end multifunction system based on the same components. To upgrade functionality, software in the one ore modules can be activated or updated, which results in the modules not needing to be replaced when upgraded. This reduces installation time and overall cost of the conveyance system.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A conveyance system comprising:

an elevator car;

a local gateway configured to communicate with a remote system over a communications network;

at least one module in communication with the local gateway;

the at least one module including at least one of:

a sensor module mounted to the elevator car, the sensor module including a sensor configured to detect a condition at the elevator car and a processor configured to perform local processing of data from the sensor at the sensor module, the local processing comprising determining car location or determining faults;

a car level module mounted to the elevator car, the car level module including a location sensor configured to detect a location of the elevator car relative to a landing and a processor configured to perform local processing of data from the location sensor at the car level module, the local processing comprising computing a distance and direction of car movement needed to level the elevator car with a landing;

a light presence module mounted to the elevator car, the light presence module including a light sensor configured to detect a light level in the elevator car and a processor configured to perform local processing of data from the light sensor at the light presence module, the local processing comprising determining if a sensed light level is greater than a threshold; and an operating panel module mounted to the elevator car, the operating panel module including a user interface and a processor configured to perform local processing of data from the user interface at the operating panel module, the local processing comprising processing an input into a format usable by a system controller.

2. The conveyance system of claim 1, wherein the condition detected by the sensor of the sensor module includes at least one of acceleration, air pressure and sound.

3. The conveyance system of claim 1, further comprising:

a voice module mounted to the elevator car, the voice module including a microphone and a speaker.

4. The conveyance system of claim 3, wherein the voice module is configured provide at least one of uni-directional and bi-directional voice communication at the elevator car.

5. The conveyance system of claim 1, wherein the user interface is configured to receive a destination floor from a passenger.

6. The conveyance system of claim 1, wherein the user interface includes an audio/video unit.

7. The conveyance system of claim 1, further comprising:

a processing module mounted to the elevator car, the processing module including a wireless interface and a wired interface.

8. The conveyance system of claim 7, wherein the wireless interface provides communication between the processing module and a second module of the at least one module.

9. The conveyance system of claim 8, wherein the processing module provides local processing of data received from the second module to generate processed data.

10. The conveyance system of claim 8, wherein the processing module is configured to provide the processed data to the local gateway.

11. The conveyance system of claim 7, wherein the wired interface is configured to communicate over an elevator system bus.

12. The conveyance system of claim 7, wherein the wired interface is configured to provide power to the processing module.

13. The conveyance system of claim 7, wherein the at least one module includes the car level module, the light presence module, the sensor module, and the operating panel module.

14. The conveyance system of claim 1 wherein the at least one module includes a power source.

15. The conveyance system of claim 14 wherein the power sources includes at least one of a battery, a power line, an inductive power receiver, a regenerative power source and an energy harvesting device.

16. The conveyance system of claim 1, wherein the at least one module includes at least two of the car level module, the light presence module, the sensor module, and the operating panel module.

* * * * *